Patented Feb. 19, 1935

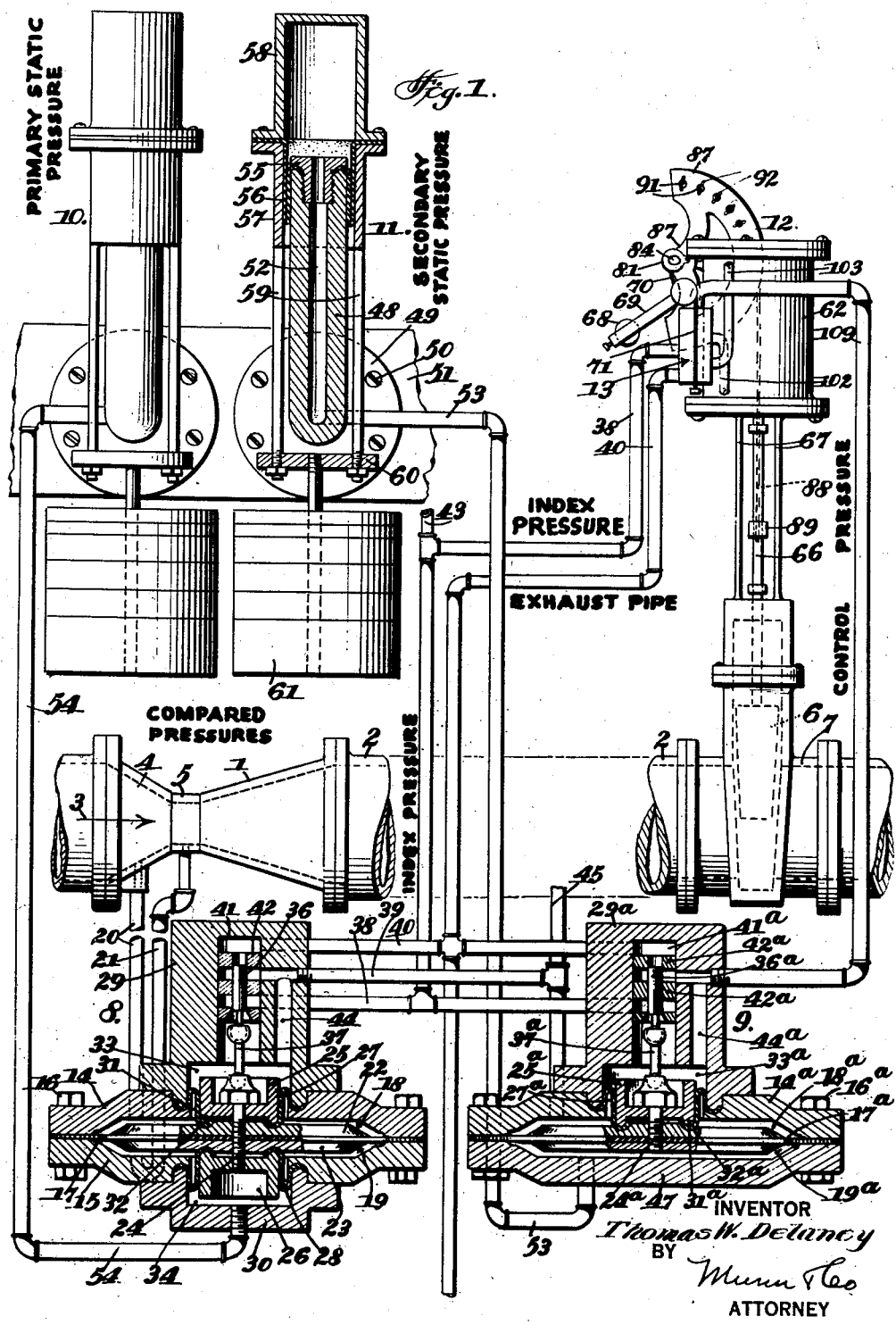

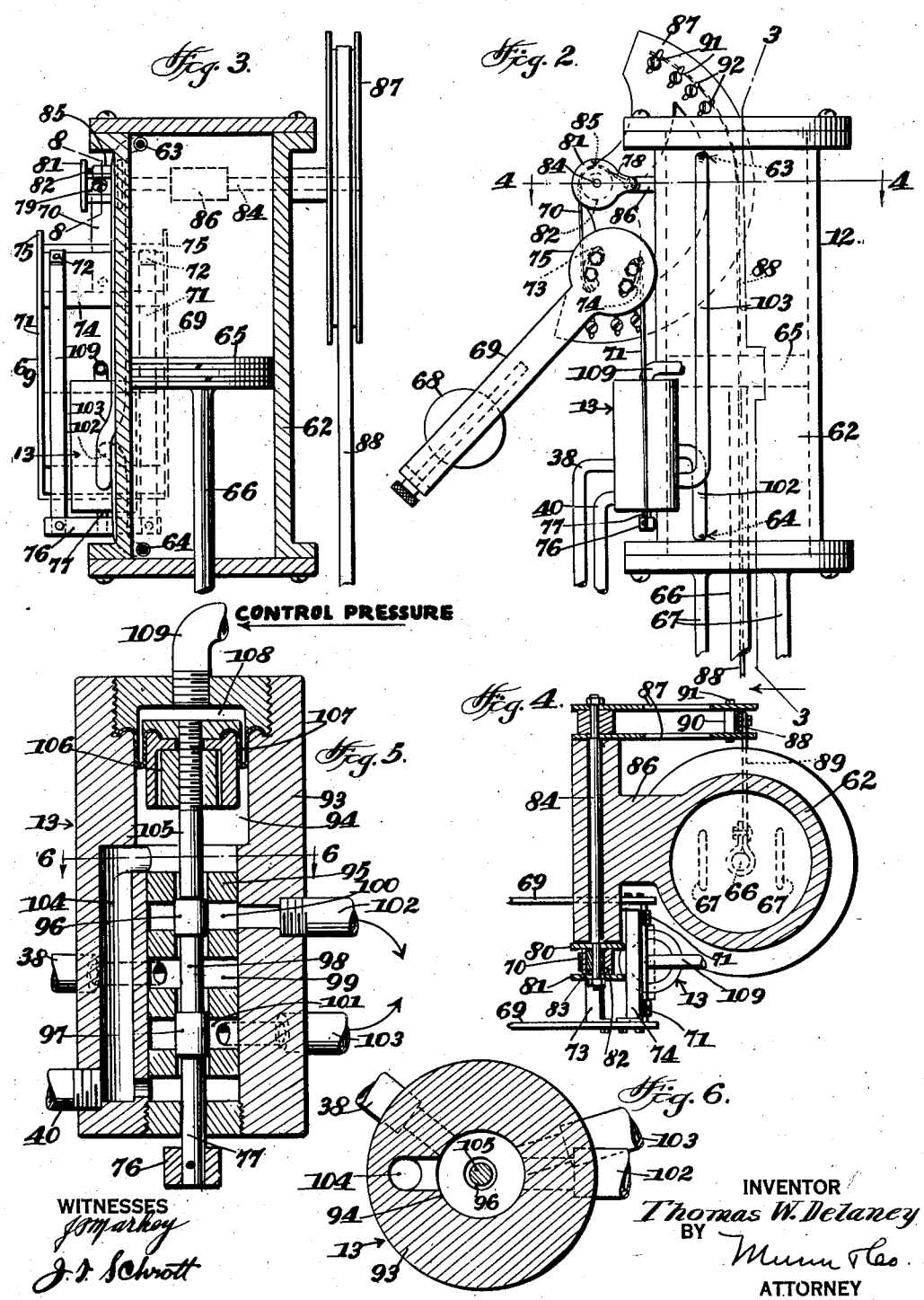

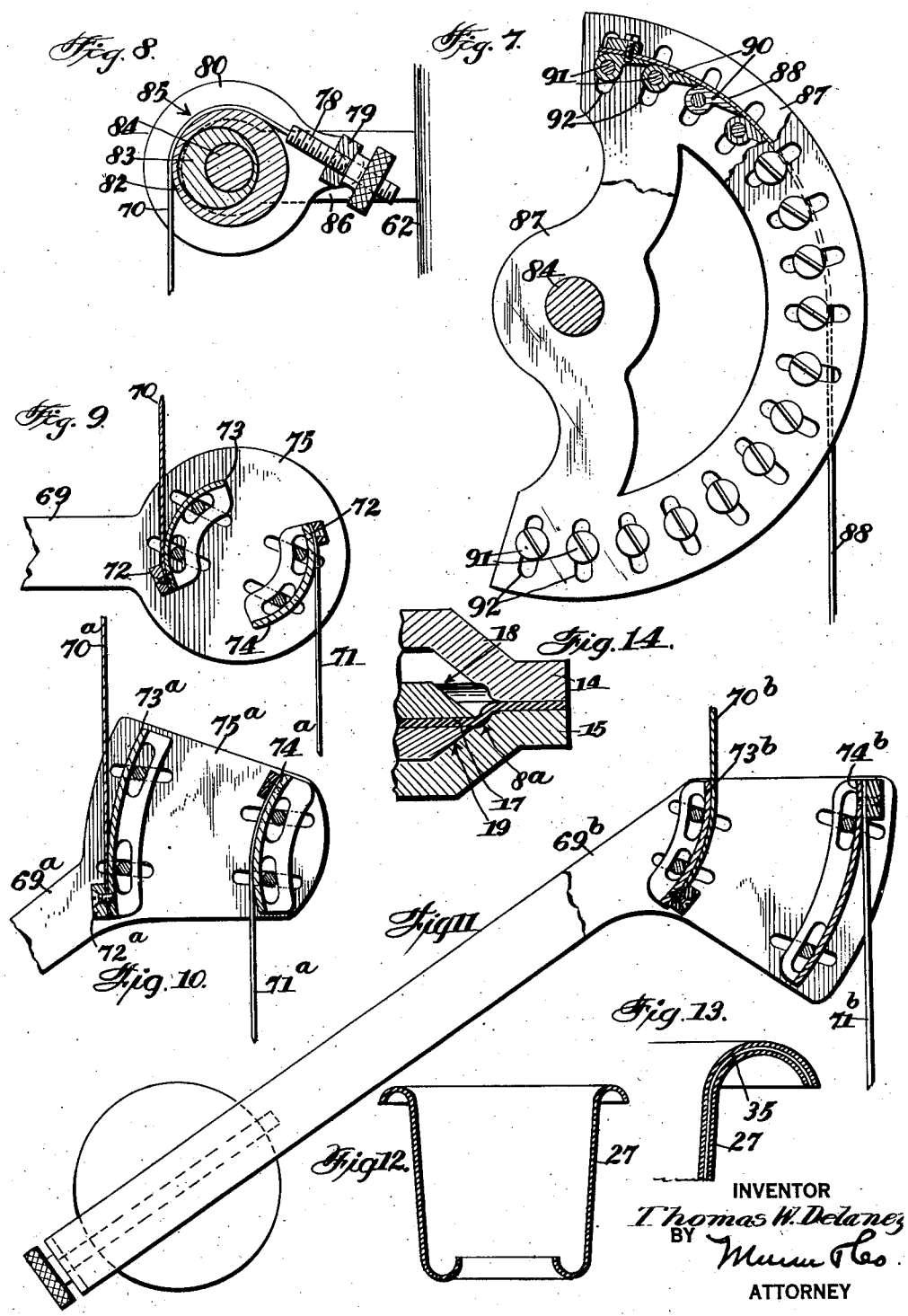

1,991,663

UNITED STATES PATENT OFFICE 1,991,663

DIFFERENTIAL PRESSURE AMPLIFIER AND FLOW CONTROLLER

Thomas W. Delaney, St. Paul, Minn.

Application April 8, 1932, Serial No. 604,095

18 Claims. (Cl. 137—152.5)

This invention relates to improvements in fluid-pressure regulators and its objects are as follows:—

First, to provide an apparatus which depends for its operation upon varying pressure conditions in a pipe line, the result of the varying operation of the apparatus being to actuate a main valve or some other governing device in the pipe line to regulate the flow of fluid, the general purpose of the apparatus therefore being to cause the flowing fluid to bring about its own regulation as to the rate of flow.

Second, to provide simple, positive mechanisms having low friction losses, whereby small differences between two compared pressures will vary on a magnified scale a fluid pressure from some independent source, but in definite relationship to the first two pressures, the controlled independent pressure being then used to regulate some mechanism which it is desired to operate in accordance with said first two differences in pressure.

Third, to provide such an apparatus which is capable of utilizing the difference in pressure on the opposite sides of an orifice plate, Venturi tube or other metering device for the purpose of actuating a main valve or other control in the pipe line thereby to regulate the flow of fluid in said line.

Fourth, to provide instrumentalities to be used in conjunction with an orifice plate or the like in a pipe line for the purpose of magnifying or amplifying the pressure differential between the inlet and outlet sides of said plate, the object in this magnification or amplification being to enable a practically instantaneous response of the valve or other control device in the pipe line for an immediate regulation of the flow of fluid so that the latter may be kept virtually constant.

Fifth, to provide a unique diaphragm structure which, as will later be brought out, is responsive to very small changes in pressure differences on the opposite sides of an orifice plate, and even though this diaphragm is sometimes suddenly subjected to relatively high pressures its arrangement is such that it is virtually immune to rupture.

Sixth, to provide an operating device for the foregoing valve or other pipe line control, said device including elements which are particularly adapted to cooperate with the aforesaid amplifying means so that fluctuations of the latter may result in an instant response in said operating device.

Other objects and advantages will appear in the following specification, reference being had to the accompanying drawings in which, Figure 1 is a diagrammatic view, partly in elevation and in section, illustrating the general assemblage of the apparatus for amplifying pressure differentials and controlling the flow in a pipe line.

Figure 2 is a somewhat enlarged elevation of the operating device which, as shown in Figure 1, actuates the valve or other control in the pipe line.

Figure 3 is a vertical section taken substantially on the line 3—3 of Figure 2.

Figure 4 is a horizontal section taken on the line 4—4 of Figure 2.

Figure 5 is a vertical section of the control valve of the operating device in Figure 2.

Figure 6 is a horizontal section taken on the line 6—6 of Figure 5.

Figure 7 is an elevation of a certain sector used in conjunction with the operating device in Figure 5, portions being shown in section.

Figure 8 is a detail section taken on the line 8—8 of Figure 3, particularly illustrating a certain eccentric spool.

Figure 9 is a detail sectional view of the hub portion of the arm of a certain balance used in conjunction with the operating device in Figures 1 and 2.

Figure 10 is a view similar to Figure 9 but illustrating a modified arrangement of segments.

Figure 11 is a combined elevational and sectional view of a slightly different type of balance, illustrating a further modification in the arrangement of the segments.

Figure 12 is a sectional view of one of the so-called tube diaphragms which are used in a number of important places in the apparatus.

Figure 13 is an enlarged sectional view of a portion of the tube diaphragm, illustrating an incorporation of inelastic elements, for instance cords, to prevent longitudinal stretching of the elastic substance of the diaphragm.

Figure 14 is a detail sectional view of a portion of one of the amplifier casings illustrating an ogee curvature for preventing sharp bending of the diaphragm.

The foregoing statements afford a general idea of the purpose of the invention which, briefly stated, is to develop what is herein conveniently termed an index pressure which will be varied in proportion to the difference between two compared pressures set up in a pipe line or other conduit. The ultimate purpose of the index pressure is to exercise a governing effect on a final pressure which is conveniently termed the control pressure, the purpose of this pressure being to operate a valve in the conduit so as to increase or diminish the flow as the final result of the variation in the original compared pressures in the conduit.

These compared pressures, also herein known as the differential pressures, may occur on the opposite sides of an orifice plate incorporated in the conduit wherein there is a flow of fluid. Or the compared pressures may be found as between a constant pressure and a variable one of nearly equal value compared thereto; the difference in the static head of two fluid columns; etc., the purpose of the invention in any instance being to respond to small differences in pressure which in themselves would be insufficient to directly operate heavy mechanisms without excessive lag due to friction losses.

In many cases the difference per unit of area between two compared pressures is very small as compared to the pressures themselves. It is this differential of pressures which is herein intended to utilize as the means for amplifying or magnifying the index pressure derived from an outside source, and expressed in a third variable pressure which is caused to ultimately regulate the fluid flow in which the original pressure differential is set up.

All this will be made clear by first describing the invention in connection with one of its applications, namely a pipe line or other conduit (Fig. 1). The idea is to maintain a substantially constant rate of flow of fluid in this pipe line whether that fluid be a gas or liquid.

It is of course commonly known that when it is desired to measure the rate of flow of fluid in a pipe line or other conduit, an orifice plate, Venturi tube or other obstruction is inserted in the pipe line, thereby setting up one pressure on one side and another pressure on the other side. The invention does not contemplate the measurement of the rate of flow but it does make use of the pressure differential set up by the measuring device, the type of which herein adopted is the Venturi tube 1. This is connected in a pipe line 2 so that the flow in the direction of arrow 3 first reaches the inlet 4 and then passes through the throat 5.

It is in the throat 5 that pressure gives way to velocity. Assuming a fluid flow at a uniform rate the velocity in the throat 5 will exceed the pipe line velocity at the left of the Venturi tube, but the pressure head in the inlet 4 will exceed the pressure head in the throat 5. Whenever there is an increase of flow from a given rate there will be a predominance of pressure in the inlet 4 over the throat 5, but when the flow drops below a given rate there will be a temporary predominance of pressure in the throat 5 over the inlet 4. This pressure differential is utilized as the force for controlling the closing and opening movements of a valve 6 which has its casing 7 connected in the pipe line. When the rate of flow in the direction of arrow 3 exceeds a determined amount the valve 6 is lowered so as to restrict the flow. On the other hand, when the rate of flow drops below the determined amount, the valve 6 will be raised so as to increase the flow.

The means by which this fluid flow regulation is accomplished comprises a primary amplifier 8, a secondary amplifier 9, a primary accumulator 10 which works in conjunction with the primary amplifier 8 and exercises a constant force in one part thereof, a secondary accumulator 11 which works in conjunction with the secondary amplifier 9 and exercises a constant force on a part thereof, an operating device 12 which causes the operation of the valve 6, and a control valve 13 which controls the operating device 12.

The amplifier 8 regulates, manages or dispenses an externally supplied index pressure the variations of which will be in exact proportion to changes in the rate of flow in the pipe line 2. The amplifier 9 takes in some of said index pressure and converts it into a control pressure which is varied in the same proportion as the rate of flow in the line 2 but which will act in an inverse direction, that is to say, the control pressure increases as the index pressure decreases and vice versa.

Covers 14, 15 (Fig. 1) are secured to each other at 16 so as to form a casing and clamp a large diaphragm 17 between them, so that the diaphragm divides the internal space afforded by the shape of the covers into upper and lower chambers 18, 19. A pipe 20 establishes communication between the inlet 4 of the Venturi tube and the upper chamber 18, while a pipe 21 establishes communication between the throat 5 of the Venturi tube and the lower chamber 19. These pipes are to be connected as shown, and whenever liquids are the flow media as in the present instance, vent valves (not shown) will be connected to the highest point of the installation.

When no fluid flows in the pipe line 2 the pressures above and below the diaphragm 17 will be equal so that the diaphragm 17 stays in the mid position. When the flow of fluid is first started in the direction of arrow 3, the reduced throat pressure (in throat 5) will enable the higher inlet pressure (in inlet 4) to depress the diaphragm 17 and cause the escape of a small volume of index pressure fluid with the final effect of partially closing the valve 6. However, the forces in the amplifiers 8 and 9 soon balance themselves so that the valve 6 is established in a rest position from which it will not be disturbed until either of the following abnormal conditions occurs.

When the rate of flow becomes excessive there will be a more notable reduced throat pressure and a predominating inlet pressure, causing a downward flexure of the diaphragm 17 and an escape of index pressure with an ultimate closing movement of the valve 6. When the rate of flow diminishes there will be an actual increase in pressure in the throat 5, causing actions in the entire system reverse to those occurring upon a flow increase, with the ultimate result that the valve 6 will be given an opening movement.

The pressure differentials which cause the opposite flexures of the diaphragm 17 are to be regarded as small. For instance, it will take only a very little increase in pressure at the outlet 5 (Fig. 1) to move the diaphragm 17 from its normally central position. The diaphragm 17 is protected from being torn or otherwise injured under sudden increases of pressure by plates 22, 23 which cover most of the opposite sides of the diaphragm, leaving only a relatively narrow flexible annulus. A sudden increase of pressure either above or below the diaphragm will be stopped in its flexing effect by the striking of either the plate 23 or plate 22 against the respective cover, at which time said annulus will adapt itself to one of a pair of recesses, each having ogee curvatures 8ª (Fig. 14), designed to prevent sharp bending of the diaphragm.

A bolt 24, or its equivalent, connects upper and lower followers 25 and 26 in such a way as not only to clamp the diaphragm 17 between the plates 22 and 23 but also to clamp the inner ends of flexible tubes 27, 28 against the plates 22, 23. The outer end of these tubes are clamped against the covers 14, 15 by a valve body 29 in the first instance and a closure cap 30 in the second instance.

In all cases the ends of the tubes 27, 28 are clamped by what might be called socket structures in order to exercise a tight grip and to make a fluid seal. For example, the follower 25 has an annular flange 31 which is rounded in the radial direction, while the adjacent part of the plate 22 has annular concavity 32 in which the flange 31 substantially fits. When the pressure of the bolt 24 is applied, the inner end of the tube 27 will be gripped, set and sealed between the flange 31 and the concavity 32 so as to make the desired joint. The same principle prevails in the mode of connecting the outer end of the tube 27 and both ends of the tube 28.

The tubes 27, 28 assume a doubled position when clamped in place as stated. The doubled portions arrange themselves along side of the followers 25, 26 about as shown (Fig. 1). The followers are nearly equal in diameter to the diameters of the high pressure chambers 33, 34 respectively in the valve body 29 and closure cap 30. The doubled tubes work in the space between the followers and the vertical walls of the chambers, this arrangement being adopted with the particular end in view of exposing only relatively small portions of the tubes to the high pressures and thereby reducing the possibilities of a rupture to a minimum.

One of the tubes, for instance 27, is shown in detail in Figure 12. This is the general shape of the tube before it has been doubled and clamped in place by the follower 25 and valve body 29. The tube is composed of rubber or other flexible material. It has numerous cords 35 (Fig. 13) or other inelastic elements embodied therein in the direction of its length. These cords are intended to prevent longitudinal stretching of the tube, but they do not in the least restrict the bending movements of the doubled part of the tube when axial motions of the diaphragm structure occur. Insofar as the relationship of the tubes 27, 28 to the chambers 33, 34 is concerned they are diaphragms. They are capable of having comparatively high pressures imposed on them without the need of any reinforcement, the reasons for this capability being the doubled arrangement already mentioned and the fact that only the annular rim of the doubled over part is exposed to the pressure.

A pilot valve 36 (Fig. 1) is coupled with the diaphragm assemblage by means of a link 37 so that when the assemblage moves up or down the pilot valve moves likewise. Pipes 38, 39, 40 lead into a bore 41 of the valve body 29 which bore communicates with the chamber 33. The entrance points of the various pipes are partitioned from each other by a set of separated disks 42 which are axially apertured to provide a seat for the pilot valve 36.

The pipe 38 is a pipe conveying the previously mentioned index fluid derived from any appropriate outside source and delivered thereto by means of a connection at 43 or elsewhere. The pressure fluid or index pressure in this pipe is adapted at times to actuate the primary and secondary amplifiers 8, 9 and also the operating device 12 to move the valve 6 toward closed or open positions, depending on how it is liberated by the amplifier 8 and control valve 13.

The pipe 39 transfers variable volumes of index pressure to the amplifier 9, the amount depending on the extent of opening of the pilot 36. This pipe has a branch 45 which is provided for connection to other possible cooperating mechanism (not shown). When a change in relative pressures acting above and below diaphragm 17 occurs, the diaphragm 17 and its pilot valve 36 are moved either to admit pressure fluid from the pipe 38 to the chamber 33 or release it from the chamber 33 to the exhaust pipe 40 until the forces acting on the diaphragm assemblage are again equalized whereupon the diaphragm 17 is returned to its mid-position and the pilot valve 36 is closed.

The pipe 40 is an exhaust pipe. It serves each of the amplifiers 8, 9 as well as the control valve 13. Should the pilot valve 36 (Fig. 1), citing this for example, be moved downwardly there would follow a diminution of pressure in the chamber 33 by way of the duct 44, and there would also be a diminution in index pressure in the pipe 39 by virtue of the escape of fluid therefrom in common with that in the chamber 33.

Each of the foregoing pipes is also connected to the secondary amplifier 9. The construction of this amplifier is nearly the same as that of the primary amplifier 8, the exception being this:—There is a bottom cover 47 which does not have any provision for a follower such as 26. The equivalents of this follower and its tube diaphragm 28 are omitted because in this instance there is no necessity for a high pressure chamber below the large diaphragm.

In order to simplify the description, those parts of the secondary amplifier which are the same as corresponding parts in the amplifier 8 are designated by similar reference characters having exponent letters. For instance the cover plate 14ª is secured at 16ª to the previously mentioned cover 47 so as to clamp the large diaphragm 17ª between them, etc. The pressure pipe 38 communicates with the bore 41ª at the space between the bottom and intermediate ones of the disks 42ª, while the exhaust pipe 40 communicates with the same bore at the space between the uppermost disk and the top of the bore. The index pressure pipe 39 communicates with the upper chamber 18ª.

The accumulators 10 and 11 are identical in construction so that the specific description of the accumulator 11 which is shown in section (Fig. 1) will apply to the accumulator 10. A plunger 48 is made stationary by virtue of being provided at the bottom with a flange 49 which is secured at 50 to a fixed support 51.

This plunger is made hollow, and its bore 52 is connected with a pipe 53 which leads to the lower chamber 19ª of the amplifier 9. A similar pipe 54 connects the accumulator 10 with the high pressure chamber 34 of the amplifier 8. In practice the accumulator 10 is loaded to develop fluid pressure per unit of area equal to that desired for index pressure when there is no flow in the pipe line 2. The pressures above and below diaphragm 17 then being equal it follows that index pressure will be brought to accumulator pressure before equilibrium is established and the pilot valve 36 closed.

The accumulator 11 is loaded to develop a pressure per unit of area equal to the index pressure developed by the primary amplifier when fluid is flowing in the pipe line 2 at the desired rate. This accumulator pressure acting below diaphragm 17ª is opposed by primary index pressure applied by means of pipe 39 and acting above diaphragm 17ª. It will be seen that when fluid is flowing through the pipe line 2 at the rate for which the accumulator 11 has been loaded to maintain, the pressures in 18ª, 19ª and 33ª will all be equal.

Any inequality in forces acting above and below diaphragms 17ª and 27ª will be corrected by the admission or release of fluid pressure to or from chamber 33ª through pilot valve 36ª. Assuming that the rate of flow is increased by outside causes above that desired, the primary index pressure will be decreased with the ultimate result of a closing movement of the valve 6. The action in the amplifier 9 will include an upward motion of the diaphragm 17ª so that the pilot 36ª opens to admit pressure fluid from pipe 38 to chamber 33ª until the forces acting on diaphragms 17ª and 27ª are again balanced.

A mouthpiece 55 (Fig. 1) secures one end of a tube diaphragm 56 to the plunger 48, the other end of this diaphragm being clamped between the flanges of a cylinder 57 and a cap 58. The tube diaphragm 56 is the same in every respect as the tube diaphragm 27 illustrated in detail in Figure 12.

Extensions 59 from the cylinder 57 are connected by a yoke 60 from which an adjustable arrangement of weights 61 is suspended. The arrangement is such that weights can be added or subtracted so as to variably load the respective accumulator. In this respect the cylinder 57 is capable of axial movement, and the function of the closed cap 58 is to press down upon the impounded fluid so as to maintain a static pressure in the chamber 19ª. The accumulator 10 has the same effect on the chamber 34.

The so-called operating device 12 (Fig. 1) has for its sole purpose the shifting of the valve 6 in opening and closing movements. It comprises a cylinder 62 (Figs. 2 and 3) which is entirely closed with the exception of top and bottom ports 63, 64. It contains a tightly fitted piston 65 which has connection by means of a rod 66 with the valve 6. When pressure fluid is admitted at the port 63 (Fig. 3) the resulting downward movement of the piston 65 tends to close the valve 6. When pressure fluid is admitted at the port 64 the resulting upward movement of the piston opens the valve 6. The cylinder 62 is stationary in reference to the valve casing 7, being attached to the bonnet of the latter by standards 67.

A balance weight 68 and arm 69 (Fig. 2) are worked in conjunction with the operating device 12 both for the purposes of the operating device 12 and its control valve 13. The arm is virtually floated in midair between tapes 70, 71, and the weight of the elements 68, 69 keeps the tapes 70, 71 and another tape 88 under tension at all times. The near ends of the tapes 70, 71 are secured at points 72 (Fig. 9) to segments 73, 74 which are adjustably mounted between the circular hub pieces 75 of the arm 69.

The arm is made in the form of a U (Fig. 3), the hub pieces representing the open terminal. The segments 73, 74 extend across from one hub piece to the other. There is only a single tape piece 70, and this is secured in the middle of the segment 73. There are two of the tapes 71 (Fig. 3), and the bottom ends of these are attached to a yoke 76 (Fig. 3) which extends across the lower end of the control valve 13. The yoke has a fixedly carried stud 77 (Fig. 5) which extends up into the valve 13.

The free end of the tape 70 (Fig. 2) is adjustably secured at 78 (Fig. 8) to the bridge 79 of a spool which comprises flanges 80, 81 (Figs. 3 and 4) and a ring 82 (Fig. 8). This ring is mounted on an eccentric 83. The flange 81 is removable, and when it is removed the ring 82 and eccentric 83 are freely turnable in respect to each other and in respect to a shaft 84 so that an adjustment can be made as to the elevation of the bight 85 of the tape 70 (Fig. 8). After this adjustment has been made the flange 81 is put back and so locks the ring 82 and eccentric 83 in place.

A bracket 86 (Fig. 8) supports the shaft 84 on the side of the cylinder 62 (Figs. 2 and 3). That end of this shaft opposite to the one carrying the foregoing spool has a sector 87 mounted on it (Fig. 7). This sector is secured to the shaft. It carries the previously mentioned tape 88 which provides a connection between the sector and a crosshead 89 on the piston rod 66 (Fig. 1). The tapes 71, 70 and 88 (Fig. 1) collectively comprise a flexible means by which the rocker arm 69 is connected to the piston 65 (Fig. 2) and to the pilot valve 96 (Fig. 5). The flexible means is connected to the arm at two near points 72 (Fig. 9) and to the respective piston and valve at two remote points 89 (Fig. 1) and 76 (Fig. 2). The face of the sector to which the upper end of the tape 88 is applied (Fig. 7) is made up of a series of arc pieces 90, each mounted on a stud 91 passing through radial slots 92 in the side plates of the sector. The sector is composed of a pair of side plates (Fig. 4) between which the arc pieces are assembled.

The arc pieces are capable of being moved toward and away from the axis of the sector so as to either change the radius or contour of the sector face thus to adjust the sector for various motions of the piston 65 in different parts of its stroke in relationship to changes in pressure acting on the follower 106. As a consequence the tape 88 is brought either closer to the axis or spaced farther from it so as to establish an adjustment which a given condition may demand.

While on the present subject, attention is directed to Figures 10 and 11. These views illustrate modifications of the balance arm 69. In Figure 10 the balance arm 69ª carries segments 73ª, 74ª which are arcuate in form and struck from a center remote from the hub piece 75ª. This center would be located somewhere at the right of the arm 69ª. The tapes 70ª, 71ª are attached at diametrically opposite points as in the instance of Figure 9, but contrary to the latter the places of attachment occur at the left sides of the segments rather than at the left and right.

In Figure 11 the arm 69ᵇ carries segments 73ᵇ, 74ᵇ which are struck on arcs of circles having a center at the left of the arm. The connections of the tapes 70ᵇ, 71ᵇ are made similarly to those of the tapes in Figure 10. Either one or the other of the modified balance arrangements in Figures 10 and 11 may be substituted for the arrangement in Figure 9, the purpose of the former being to bring about changes in the permissible motion of the piston 65 (Fig. 3) under varying conditions of use of the operating device 12.

The control valve 13 (Fig. 1) serves the purpose of controlling the operating device 12. It comprises a casing 93 (Fig. 5) which has a bore 94 in which a set of centrally perforated disks 95 is secured in spaced relationship to each other to provide a seat for a pilot valve which is to be identified as comprising the heads 96, 97, fitting the matching perforations, and a reduced connector 98 which enables the passage of pressure fluid from the central chamber 99 to either outlet chamber 100 or 101.

The chambers 100, 101 have pipe connections 102, 103 with the ports 64, 63 (Fig. 3) at the bottom and top of the cylinder 62. Pressure fluid admitted to the pipe 102 will raise the piston 65 while pressure admitted to the pipe 103 will lower the piston.

Pressure fluid is derived at the central chamber 99 from the pressure pipe 38 (Fig. 1), mentioned earlier in the description. The escape of the spent pressure fluid from one or the other end of the cylinder 62 to the discharge pipe 40 occurs by way of a duct 104 (Fig. 5) which has communication with the spaces above and below the disk series 95.

The stud 77 (Fig. 5), previously described in connection with the tape and yoke arrangement 71, 76 (Fig. 2) engages the lower head 97 of the pilot valve. A similar stud 105 (Fig. 5), extending from a follower 106, engages the upper head 96 of the pilot valve. The pilot valve is axially movable by either stud, and when it is moved there will be an application of pressure fluid to one side of the piston 65 and an escape of spent fluid from the other side.

A tube diaphragm 107 (Fig. 5) is clamped at its extremities between the structural parts of the follower 106 and the casing 93, thus dividing the bore 94 into low and high pressure chambers, the high pressure chamber 108 occurring above the diaphragm. This chamber has communication by means of a pipe 109 with the duct 44$^a$ of the amplifier 9. When there is an increase of pressure in the Venturi inlet 4, as previously described, there will be an upward movement of the pilot valve 36$^a$ (Fig. 1), admitting pressure fluid from the pipe 38 to the duct 44$^a$, thereby causing a depression of the follower 106 (Fig. 5), likewise of the pilot valve 96, 97. Pressure fluid is then admitted to the pipe 103 and conducted thereby to the port 63 of the cylinder 62 (Fig. 3), causing a lowering of the piston 65 as well as of its attached valve 6 (Fig. 1) so as to reduce the fluid flow in the pipe line 2.

The operation is readily understood. Consider Figure 1 first and assume that there is no fluid flow in the pipe line 2. It was previously explained how the primary amplifier 8 then assumes a state of equilibrium. In other words, the so-called index pressure prevailing in the amplifier 8 will be matched by accumulator pressure in the chamber 34, the accumulator 10 having been sufficiently loaded for that purpose.

It was previously brought out how the accumulator 11 is loaded to produce a pressure in the chamber 19$^a$ equalling the index pressure supplied to the chamber 18$^a$ by the pipe 39. The equal pressures on the opposite sides of the diaphragm 17$^a$ will cause the amplifier 9 to develop a third equal pressure above diaphragm 27$^a$ to establish an equilibrium as well as to establish a control pressure which will presently be made to do useful work.

The initial result of this third or control pressure is as follows:—Inasmuch as pipe 109 communicates with the chamber 23$^a$ in which this control pressure is present it follows that this pressure will cause a downward push on the diaphragm 107 of the control valve 13 (Fig. 5). The control pressure thus forces pilot valve 96, 97 down, opening the chamber 101 to the pressure pipe 38 and causing a downward movement of the piston 65 (Fig. 3). The connection of pipe 103 (Fig. 5) should be traced to the top of the cylinder 62 in Figure 3.

This downward movement of the piston 65 acts through tape 88 (Fig. 2) on sector 87, shaft 84 and tape 70 to raise the arm 69, the weight 68 then exercising an upward pull on the tapes 71 equal to the foregoing downward push on the diaphragm 107 (Fig. 5). The effect of opposing the downward fluid push with the upward weight pull is to close the pilot valve 96, 97, and it is now that neutrality prevails in the entire apparatus.

Assume the start of a fluid flow in the pipe line 2 (arrow 3). This flow will be started by the opening of some valve elsewhere in the pipe line. The valve 6 is merely for the purpose of automatically controlling the flow so that the rate will be kept substantially uniform. The moment the flow starts there will be a lower pressure in the throat 5 (Fig. 1) than in the inlet 4, enabling the predominating inlet pressure to flex the diaphragm 17 downwardly, open the valve 36 to the bore 41 and liberate a quantity of index pressure from chambers 33 and 18$^a$ to the exhaust pipe 40, cause an upward flexure of the diaphragm 17$^a$, an opening of the valve 36$^a$ to the pressure pipe 38 so that the chamber 33$^a$ is augmented with a pressure sufficient to further push down the diaphragm 107 (Fig. 5).

This shifts the pilot valve 96, 97 downwardly (Fig. 5), opening the chamber 101 to the pressure pipe 38 and supplying the upper end of cylinder 62 (Fig. 3) with a pressure which moves piston 65 downwardly. Inasmuch as the rod 66 of this piston is connected with the valve 6 a closing movement of the latter is inaugurated, but the duplication of the clockwise turning of the shaft 84 and raising of the arm 69 repeats the reverse and upward pull on the valve 96, 97, restoring the latter to the closed position and checking the valve 6 after it has made but a slight advance toward the closed position.

Assume an undesired increase in the fluid flow in the pipe line 2. The lesser pressure in the throat 5 will enable the predominating pressure in the inlet 4 to flex the diaphragm 17 downwardly, again opening the valve 36 to establish communication between the chamber 33 and bore 41. The consequent escape of index pressure from both the chamber 33 and the chamber 18$^a$, the latter being of the amplifier 9, will cause an upward flexure of the diaphragm 17$^a$ and the administration of pressure fluid to the pipe 109 by way of the pipe 38 and chamber 33$^a$.

The pressure in the pipe 109 will push the diaphragm 107 downwardly (Fig. 5), open the chamber 101 to the pipe 38 and introduce pressure fluid from said pipe to the top of the cylinder 62 (Fig. 3) by way of pipe 103 and port 63. The resulting downward movement of the piston 65 and its rod 66 will produce a closing movement of the valve 6 (Fig. 1) but this movement is limited as before by the clockwise turning of the sector 87 (this being connected with the rod 66 by means of a tape 88) and the ultimate lifting of the arm 69 which produces an upward pull on the stud 77 thereby to restore the pilot valve 96, 97 to the closed position.

Assume a decreasing flow in the pipe line 2 below a rate for which the mechanism is set. The effect of such a decrease is a pressure drop between the inlet 4 and throat 5, causing an actual increase in the throat pressure. This increased pressure deflects the diaphragm 17 upwardly, opening the valve 36 to the pressure pipe 38 and admitting pressure fluid from that pipe to the chamber 33 and to the chamber 18ª by way of the pipe 39. Pressure fluid will continue to flow into the chamber 33 until the force on the diaphragm 27 equals the upward force acting on the diaphragm 17, whereupon the diaphragm 17 will again be in the balanced position and the valve 36 closed.

The increased index pressure, now evident in the chamber 18ª, will deflect the diaphragm 17ª downwardly, opening valve 36ª to release pressure fluid from the pipe 109 into the exhaust pipe 40. This release will continue until the force acting on the diaphragm 27ª has been decreased an amount equal to the increase in force acting above diaphragm 17ª, this restoring an equilibrium and causing the closure of the valve 36ª. Decreased pressure in the pipe 109 enables the arm 69 (Fig. 2) to raise the pilot valve 96, 97 (Fig. 5) by virtue of its tape connections with the yoke 76, admitting pressure fluid from the pipe 38 to the bottom of the cylinder 62 by way of pipe 102 and port 64 thus to raise the valve 6 (Fig. 1) until the desired rate of flow in the pipe line 2 is restored.

It will be perceived from the foregoing examples that there is always a definite and positive relationship between the rate of flow in the pipe line 2 and in the value of the index pressure in the chamber 33, pipe 39 and chamber 18ª. It must be borne in mind that the tendency of the amplifiers 8 and 9 and control valve 13 is always toward the return of an equilibrium, that is to say toward a neutral condition.

Whenever a change in flow in the pipe line 2 occurs of a degree sufficiently great to upset the equilibrium of the amplifier 8, the response will either be an additional influx of index pressure from the pipe 38 or a diminution of the volume of index pressure already present in the system 33, 39, 18ª. The response in either direction prevails until the former equilibrium of the amplifier 8 is established, and this principle follows through in the amplifier 9 and control valve 13 as must now be plain.

It is to be understood that the mechanism shown, particularly the modified forms of the balance arm 69 in Figures 9, 10 and 11, is of a design intended to meet a wide variety of working conditions. In other words, it is quite likely that conditions as to volume of fluid, character of fluid, viscosity, rate of flow, etc. will not be identical in any two instrumentalities. If it was necessary to provide an individual apparatus for every variation in pipe line connections the cost of installation would be prohibitive. The instant apparatus is so universally adjustable that almost any conceivable condition can be anticipated.

The type of balance (arm 69 in Figures 9, 10 and 11) which most nearly fits the particular case being selected, the contour of the sector 87 (Fig. 7), the disposition of the ring 82 (Fig. 8) and the adjustment of the segments 73, 74 will all be so balanced that the tension on tapes 71 will exactly balance the control pressure exercised on the diaphragm 107 (Fig. 5), this force being the product of the index pressure described in chamber 33, pipe 39 and chamber 18ª (Fig. 1) by the particular rate of flow permitted by the position of the valve 6.

The sequential acts in the amplifiers 8, 9 and control valve 13 occurring upon a change of flow in the pipe line 2 as previously described, are actually not sequential acts at all. These acts follow each other so closely that they may be regarded as synchronized. The only appreciable time lag occurs in the motion of the piston 65 (Fig. 3), and the motion of this piston is limited by the speed with which the cylinder 62 is supplied with fluid pressure through either pipe 102 or 103.

I claim:—

1. Control apparatus comprising a diaphragm, means for imposing each of different compared pressures on opposite sides of the diaphragm, separate means against each of which each of separate pressures are imposed in proportions to keep said diaphragm normally balanced, a valve for controlling a fluid flow which is subject to fluctuations which gives rise to said compared pressures, mechanism for moving the valve, and means which is normally dormant in its control effect on said mechanism, but acting on a flexure of the diaphragm when one of the compared pressures predominates, thereby to cause one of said separate pressures to act on said mechanism for moving the valve.

2. Control apparatus comprising a flat diaphragm, means for imposing each of separate compared pressures on opposite sides of the flat diaphragm, a pair of auxiliary diaphragms coupled with the flat diaphragms and completing a diaphragm assemblage, one having a constant static pressure imposed thereon the other having an index pressure imposed thereon, said static and index pressures being so proportioned as to normally balance the flat diaphragm, a second flat diaphragm having a static pressure imposed on one side thereof and said index pressure imposed on the other side thereof, an auxiliary diaphragm coupled with the second flat diaphragm completing a second diaphragm assemblage and having a control pressure imposed thereon, valve means operated by an action of the first diaphragm assemblage upon a predominance of one of the compared pressures thereby to affect the index pressure and cause a flexure-response of said second diaphragm assemblage, valve means associated with said assemblage for affecting the control pressure, and means which is operated by the variation in the control pressure to rectify the cause of predominance of said one compared pressure.

3. Control apparatus comprising a primary amplifier having means for developing an index fluid pressure in magnified proportion to the difference in compared pressures in an associated fluid pipe line, a secondary amplifier having means to develop a control pressure in further magnification of said index pressure, a valve for controlling the fluid flow in said pipe line, and actuating mechanism for said valve being responsive to variations in said control pressure for adjusting the valve in accordance with fluctuations in the fluid flow as reflected in differences in the compared pressures.

4. Control apparatus comprising a primary amplifier having means for developing an index fluid pressure in magnified proportion to the difference in compared pressures in an associated fluid pipe line, a secondary amplifier having means to develop a control pressure in further magnification of said index pressure, a valve for controlling the fluid flow in said pipe line, actuating mechanism for said valve comprising a control valve movable in one direction by said control pressure, gravity operating means for moving the control valve in the opposite direction, a cylinder having communication at its opposite ends with said control valve, said valve having a source of pressure fluid connected therewith for delivery to one or the other end of said cylinder depending upon the position of the control valve, and a piston in said cylinder having a connection with the pipe line valve, said piston being movable in either of two directions by said pressure fluid, the direction of movement depending on fluctuations in the fluid flow in said pipe line which fluctuations are reflected in differences in the compared pressures.

5. Control apparatus comprising a pipe line, a valve in the pipe line, means in which fluctuations in the rate of flow in said pipe line are reflected as differential pressures, primary and secondary amplifiers associated with said means, said amplifiers cooperating in producing a control pressure which is varied in definite relationship to said differential pressures, and an operating device on which said control pressure acts to adjustably position the valve in respect to said pipe line.

6. Control apparatus comprising a flat diaphragm, covers clamping the rim of the diaphragm between them and forming a casing having chambers on opposite sides of the diaphragm, tube diaphragms at opposite sides of the flat diaphragm completing a diaphragm assemblage, means for sealing off the near ends of the tube diaphragms from said chambers, means attached to the opposite sides of the casing both sealing off the remote ends of the tube diaphragms and defining other pressure chambers to which portions of the tube diaphragms are exposed, separate means for imposing pressure fluids from independent sources on the diaphragms in each of the respective chambers, and a valve mechanism coupled with the diaphragm assemblage to control the pressure fluid in one of said chambers.

7. In control apparatus, a flat diaghragm, a casing consisting of confronting covers between which the rim of the diaphragm is clamped, each of said covers having an opening, tube diaphragms in doubled formation in each of the openings, followers applied to the near ends of the tube diaphragms and having clamping means for securing said followers in respect to the flat diaphragm, separate chambered means applied to the respective covers and clamping the remote ends of the tube diaghragms, a valve operable in one of the chambered means, and a link coupling said valve with said clamp means.

8. In control apparatus, an amplifier casing, a diaphragm fitted in the casing, a source of static pressure including an accumulator having a fixed hollow member with a pipe leading to a point at one side of the diaphragm, said accumulator including a movable member for establishing fluid pressure in said fixed member and pipe, a source of index pressure fluid including a pipe leading to a point at the other side of the diaphragm, and a valve device carried by said diaphragm for controlling the admission of index pressure fluid.

9. In control apparatus, a valve-operating device comprising a cylinder, a piston operable in the cylinder and having a rod connected with the valve, a control valve for controlling the flow of fluids in respect to the opposite end of the cylinder, said control valve including a pilot valve member, a pipe for conducting control pressure to said control valve from an external source, said valve having means on which said pressure is imposed to tend to shift the pilot valve in one direction, mean tending to shift the pilot valve in the opposite direction, said means including a structure coupled with the connecting rod, and a floating pressure device coupled between said structure and one end of the pilot valve.

10. In control apparatus, a valve body, a casing and closure cap formed and assembled to define an internal space, a plurality of flexible diaphragms arranged across the space to divide it into two adjacent pressure chambers and remote pressure chambers, means in which pressures to be compared originate and means for conducting separate fluids under comparable pressures to said adjacent pressure chambers, and separate sources of fluid under pressures which may be higher or lower than compared pressures having means for conducting fluids from said separate sources to the remote chambers.

11. In control apparatus, a valve body, a casing and closure cap formed and assembled to define an internal space, a plurality of flexible diaphragms arranged across the space to divide it into two adjacent pressure chambers and remote pressure chambers, means in which pressures to be compared originate and means for conducting separate fluids under comparable pressures to said adjacent pressure chambers, independent sources of fluids under pressures which may be higher or lower than compared pressures, having means for conducting fluids from said independent sources to the remote chambers, means for clamping the diaphragms together in the central region to form a diaphragm assemblage, and a valve operated by said assemblage to control the admission of the fluid from one of said independent sources to one of the remote chambers.

12. In control apparatus, a valve-operating device comprising a piston and a pilot valve to control the motion of the piston, means by which fluid pressure is imposed on the pilot valve to tend to shift said valve in one direction, and a floating pressure device having flexible connections to the piston and the pilot valve respectively to tend to shift said valve in the opposite direction.

13. In control apparatus, a valve-operating device comprising a piston and a pilot valve to control the motion of the piston, means by which fluid pressure is imposed on the pilot valve to tend to shift said valve in one direction, and a floating pressure device interposed between the piston and the pilot valve to tend to shift said valve in the opposite direction, said device comprising a rockable balance arm, and flexible means by which the arm is connected to the piston and pilot valve respectively and on which it is rockable.

14. In control apparatus, a valve-operating device comprising a piston and a pilot valve to control the motion of the piston, means by which fluid pressure is imposed on the pilot valve to tend to shift said valve in one direction, a pressure device interposed between the piston and the pilot valve to tend to shift said valve in the opposite direction, a balance arm and weight to produce the pressure, and flexible means connected to the arm at two near points and then to thereafter the piston and pilot valve at two remote points to sustain the arm and weight in a floating position.

15. In control apparatus, a structure defining an internal space, a plurality of flexible diaphragms arranged across the space to divide it into two adjacent chambers and two remote chambers, means in which pressures to be compared originate and means for conducting fluids under comparable pressures to the two adjacent chambers, independent sources of fluids under pressure having means for conducting said fluids to the remote chambers, means for clamping the diaphragms together to form a diaphragm assemblage which is movable in respose to changes in the relative values of the compared pressures, a valve operable by the movement of said assemblage which is movable in response to changes from one of said independent sources to one remote chamber or enable the release of pressure fluid therefrom for the purpose of restoring an equilibrium of forces acting on opposite sides of the assembled diaphragms.

16. In control apparatus, a structure defining an internal space, a diaphragm assemblage consisting of a large diaphragm and two smaller diaphragms, one on each side thereof, dividing said space into two adjacent chambers and two remote chambers, means to admit one of two comparable fluid pressures to each of the adjacent chambers, means to impose a constant loading pressure on one remote chamber and the respective smaller diaphragm, a valve operable by movement of the diaphragm assemblage controlling the admission of a pressure fluid from an independent source to the other remote chamber, or its release therefrom to increase or decrease the force acting on the second smaller diaphragm to an amount equal to the change in force acting on the large diaphragm by reason of a change in relationship between the compared pressures which caused said movement of the diaphragm assemblage.

17. In control apparatus, a diaphragm assemblage consisting of a relatively large-area diaphragm, smaller diaphragms centrally attached to opposite sides thereof, a casing and associated parts in which said assemblage is clamped to define two adjacent central chambers and two remote chambers, means to impose pressures on opposite sides of the large diaphragm, means to impose a constant loading pressure on one small diaphragm in one remote chamber, a valve operable by movement of the diaphragm assemblage when the relationship of compared pressures changes, to admit or release pressure fluid to the other remote chamber thereby increasing or decreasing the force acting on the second small diaphragm an amount equal to the change in force imposed by compared pressures on the large diaphragm which caused said movement of the diaphragm assemblage, the change in pressure per unit area imposed on the second small diaphragm being in proportion to relative changes in compared pressures, and magnified in the ratio the area of the large diaphragm bears to that of the smaller diaphragms.

18. In control apparatus, a flat diaphragm, a casing consisting of confronting covers between which the rim of the diaphragm is clamped, each of said covers having an opening and ogee curvatures providing an annular recess to prevent sharp bending of the diaphragm, tube diaphragms in doubled formation in each of the openings, followers applied to the near ends of the tube diaphragms and having clamping means for securing said followers in respect to the flat diaphragm, separate chambered means applied to the respective covers and clamping the remote ends of the tube diaphragms, a valve operable in one of the chambered means, and a link coupling said valve with said clamp means.

THOMAS W. DELANEY.